United States Patent [19]
Schuckman

[11] Patent Number: 5,255,748
[45] Date of Patent: Oct. 26, 1993

[54] TERRACING ATTACHMENT ASSEMBLY FOR A MOLDBOARD PLOW

[76] Inventor: Floyd E. Schuckman, Rte. 1, Box 26, Ransom, Kans. 67572

[21] Appl. No.: 821,485

[22] Filed: Jan. 15, 1992

[51] Int. Cl.[5] .................................. A01B 17/00
[52] U.S. Cl. ......................... 172/203; 172/759; 37/366
[58] Field of Search ............... 172/161, 162, 168, 201, 172/202, 203, 245, 253, 681, 695, 746, 754, 757, 758, 759, 772, 776; 37/98

[56] References Cited

U.S. PATENT DOCUMENTS

| | | | |
|---|---|---|---|
| 141,705 | 8/1873 | Donnelly | 172/203 |
| 155,309 | 9/1874 | Hyde | 37/98 |
| 292,272 | 1/1884 | Wood | 172/203 |
| 322,769 | 7/1885 | Williams | 172/203 |
| 483,476 | 9/1892 | Rinehart | 37/98 |
| 943,584 | 12/1909 | Whittington | 172/202 X |
| 962,701 | 6/1910 | DeWitt | 172/202 |
| 1,132,563 | 3/1915 | Corathers | 172/203 |
| 1,738,364 | 12/1929 | Ellis | 172/203 |
| 1,740,519 | 12/1929 | Miller | 172/759 |
| 1,785,964 | 12/1930 | Madden | 172/759 |
| 1,847,336 | 3/1932 | Fike | 172/203 |
| 2,055,194 | 9/1936 | Brock et al. | 172/203 |
| 2,670,550 | 3/1954 | Bowen | 37/98 X |
| 2,950,771 | 8/1960 | Yetter | 172/736 |
| 3,036,643 | 5/1962 | Duncanson | 172/736 |
| 3,050,136 | 8/1962 | Rayder | 172/759 |
| 3,050,137 | 8/1962 | Rayder | 172/759 |
| 4,058,169 | 11/1977 | Jacobsson | 172/203 |

OTHER PUBLICATIONS

"Fundamentals of Machine Operation-Tillage," John Deere Publications, pp. 52–57, 1976.

*Primary Examiner*—Randolph A. Reese
*Assistant Examiner*—Spencer Warnick
*Attorney, Agent, or Firm*—John R. Flanagan

[57] ABSTRACT

A terracing attachment assembly is used with a moldboard plow movable in a forward direction across a field. The plow includes a plurality of moldboard plow bottoms supported below the plow frame in a spaced apart and laterally staggered relation along the direction of forward movement. The terracing attachment assembly includes a plurality of elongated blades being one less in number than the number of plow bottoms and a plurality of mounting components adjustably attaching the blades to the plow frame in generally transverse relation to the direction of forward movement and adjacent to given ones of the plow bottoms other than a lead one thereof. The elongated blades are attached such that serve as extensions of the given ones of the plow bottoms and their outer end portions are provided in spaced relation to one another and aligned behind an outer end portion of the lead one of the plow bottoms generally along a line extending in a desired relationship to the direction of forward movement of the plow such that the transversely extending can move soil plowed by the given ones of the plow bottoms to the same lateral location as the lead one thereof for building a terrace on a plowed field.

19 Claims, 2 Drawing Sheets

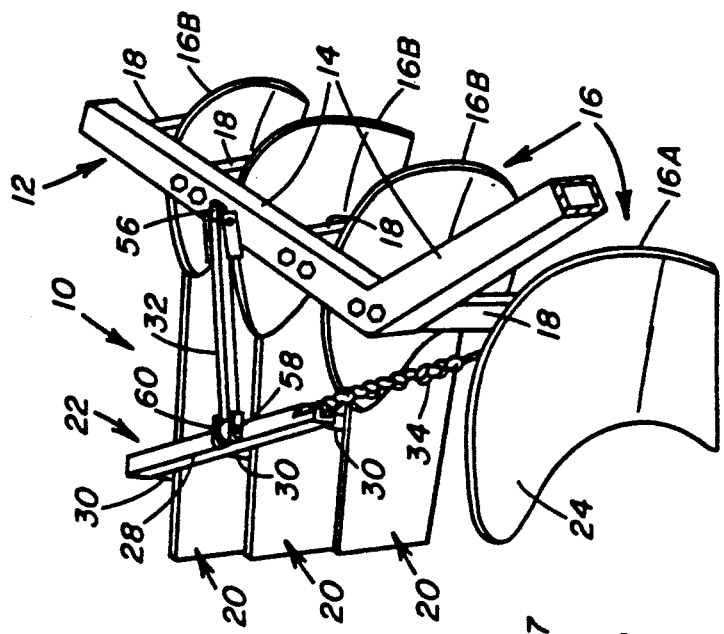
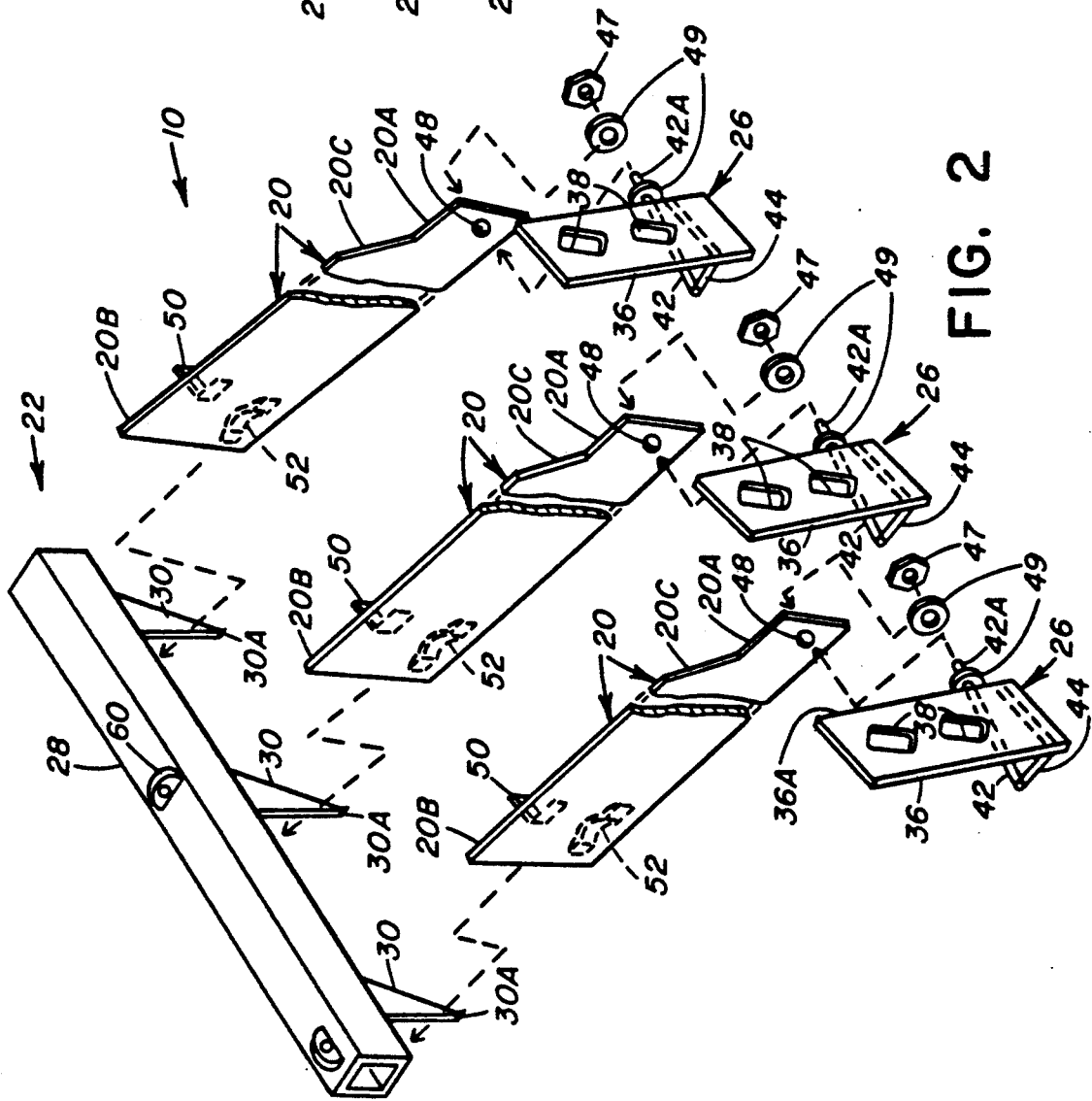

TERRACING ATTACHMENT ASSEMBLY FOR A MOLDBOARD PLOW

BACKGROUND OF THE INVENTION

1. Field of the Invention

The present invention generally relates to attachments for plows and, more particularly, to a terracing attachment assembly for a conventional moldboard plow.

2. Description of the Prior Art

For farming to take place on the hilly terrain found in many regions of the country, contour terraces must be built and rebuilt across slopes to slow moisture runoff and prevent soil erosion. The impact of weather and of normal farming operations each year wears down the terraces so that they need to be rebuilt on an annual basis.

Machines especially designed for building terraces are commercially available. However, such machines entail a substantial investment of capital just for this specific purpose. Terrace building requires the movement and relocation of significant quantities of soil. Since a moldboard plow used to loosen and turn soil is found in the equipment inventory of most farming operations, it would appear to be a likely candidate to use in building terraces.

However, the plowing of terraces by using a conventional moldboard plow does not effectively move the soil to a common location so that terraces can be built properly. As a result, a need exists for a more economical and effective way to build and rebuild terraces.

SUMMARY OF THE INVENTION

The present invention provides a terracing attachment assembly designed to satisfy the aforementioned need. The present invention offers a practical solution to the problem of terrace building and rebuilding by providing a terracing assembly as an attachment to a conventional moldboard plow. The terracing assembly employs a plurality of terracing blades which can move loose earth a greater distance than the plow itself and to a common location, thereby building terraces in a speedy and economical way without the need to make a large investment of scarce resources, such as is required in order to purchase a dedicated terracing machine.

Accordingly, the present invention is directed to a terracing attachment assembly for use with a moldboard plow. The moldboard plow is of the type movable in a forward direction across a field which includes a frame, a plurality of moldboard plow bottoms, and a plurality of mean to the frame for supporting the moldboard plow bottoms below the frame so as to be arranged in a spaced apart relation along and in a laterally offset or staggered relation to the direction of forward movement of the moldboard plow.

The terracing attachment assembly of the present invention comprises a plurality of elongated blades and means attachable to the plow frame for mounting the blades in generally transverse relation to the direction of forward movement of plow and adjacent to given ones of the moldboard plow bottoms as lateral extensions thereof. More particularly, the elongated blades less in number than the number of moldboard plow bottoms and are attached to given ones of the plow bottoms other than a lead one thereof.

The mounting means supports the blades such that their outer end portions are provided in spaced relation to one another and aligned generally along a line extending in a desired relationship to the direction of forward movement of the plow. More particularly, the outer end portions of the blades are aligned behind an outer end portion of the lead one of the plow bottoms. In such positions, the transversely extending blades soil plowed by the given ones of the moldboard plow bottoms to the same location as the lead one of the moldboard plow bottoms for building a terrace on a plowed field.

More particularly, the mounting means includes a plurality of support members attachable to the plow frame adjacent to and rearwardly of the given ones of the plow bottoms. Each support member pivotally mounts one of the elongated blades at an inner end portion thereof. The mounting means further includes an elongated spacer member extending in a generally transverse relation to and overlying the elongated blades, a plurality of connector members attached in spaced relation along the spacer member and extending downwardly therefrom behind each of elongated blades at locations on the blades being closer to the outer end portions than the inner end portions thereof, and means attached to a rear side of each of the elongated blades at the locations thereon for connecting the connector members to the respective elongated blades.

The mounting means also includes means connectible to the plow frame and coupled to the elongated spacer member for supporting the spacer member laterally outwardly from the plow frame at desired position relative to the plow bottoms. The mounting means further means connectible to the lead one of the plow bottoms and connected to a forward end of the elongated spacer member for transferring loads imposed on the elongated blades by the soil moved by the blades to the lead one of the plow bottoms.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a front perspective view of a terracing attachment assembly of the present invention mounted to a frame beam of a moldboard plow.

FIG 2. is an enlarged exploded fragmentary perspective view of the terracing attachment assembly of the present invention.

DETAILED DESCRIPTION OF THE INVENTION

Figure 3:
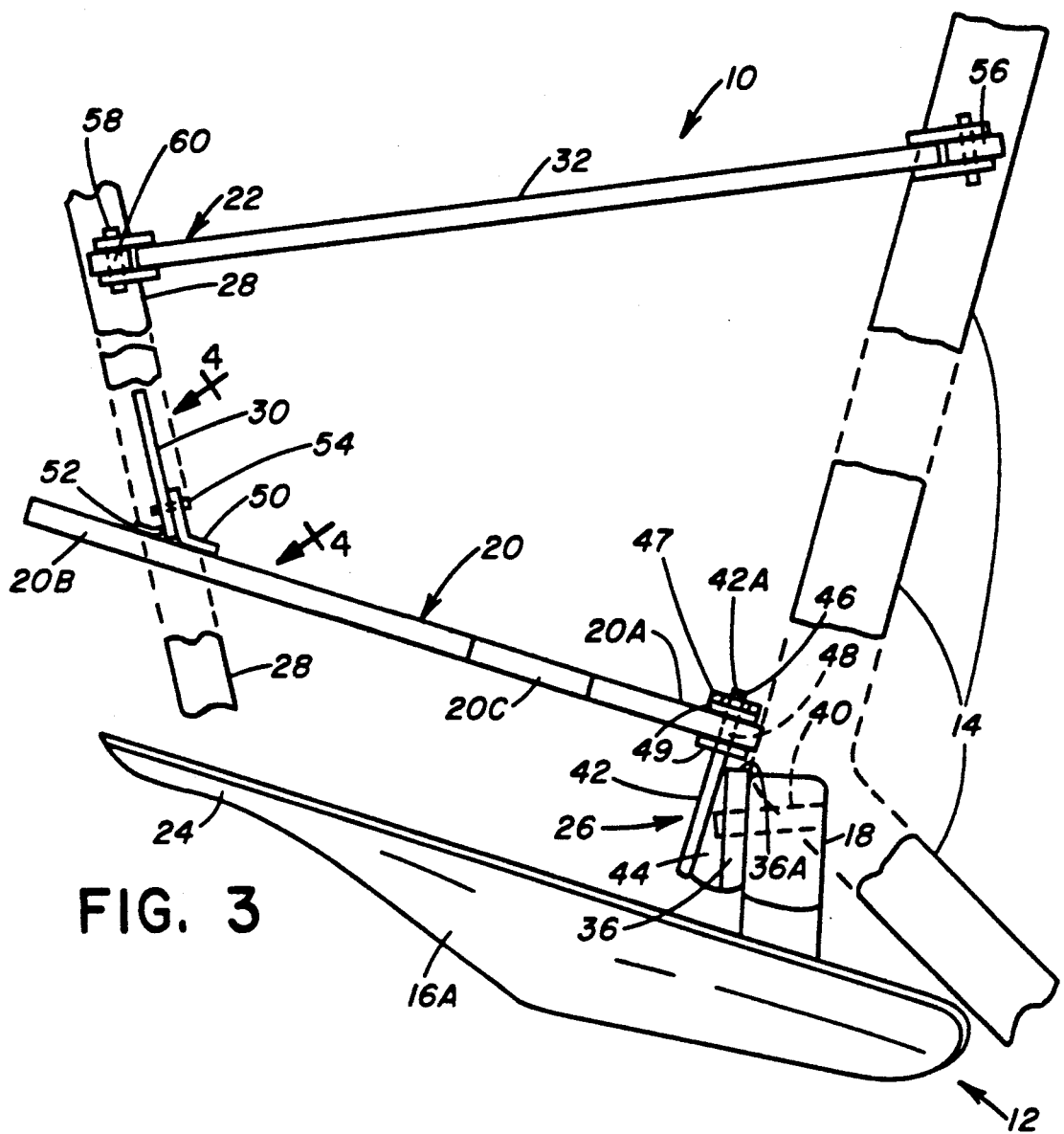
FIG. 3 is an enlarged fragmentary top plan view of the terracing attachment assembly of FIG. 1.
Figure 4:
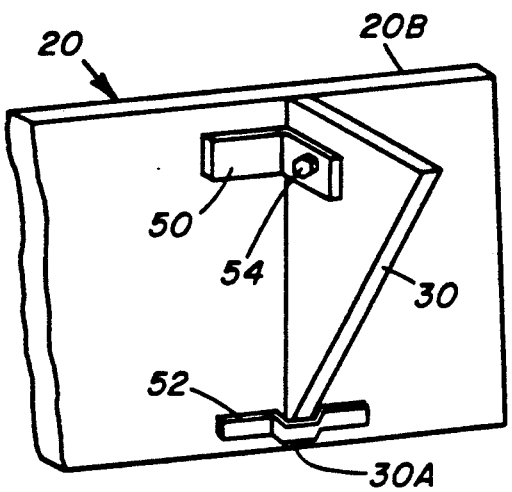
FIG. 4 is an enlarged fragmentary rear perspective view of one of the blades of the terracing attachment assembly as seen along line 4—4 of FIG. 3.

Referring to the drawings, and particularly to FIG. 1, there is illustrated a terracing attachment assembly, generally designated 10, of the present invention mounted to a conventional moldboard plow 12, being only partially illustrated in FIG. 1. The moldboard plow 12 basically includes a longitudinal frame 14, four moldboard plow bottoms 16, and four legs 18 a to the frame 14 and supporting the moldboard plow bottoms 16 below the frame 14.

The moldboard plow bottoms 16 are arranged by the legs 18 in spaced apart and laterally offset or staggered relation to one another between the front and rear of the plow 12 so as to turn four furrows of soil during each pass of the plow. While the plow 12 has four plow shares 16, making it a four bottoms plow, a plow with a different number of the plow bottoms can be utilized.

Referring to FIGS. 1-3, the terracing attachment assembly 10 basically includes a plurality of elongated flat terrace-forming blades 20 being preferably of rectangular configuration a less in number than the number of moldboard plow bottoms 16 of the plow 10. The blades 20 are preferably constructed of a suitable metal material. Each blade 20 has opposite inner and outer end portions 20A, 20B with a cutout or notch 20C formed in the inner end portion 20A.

The attachment assembly 10 also includes means 22 attached to the plow frame 14 for mounting each of the elongated blades 20 in a generally transverse relation to the direction of forward movement F of the plow 10 and as a lateral extension of each of the plow bottoms 16B except for the lead one plow bottom 16A. The blade-mounting means 22 is comprised of a group of components, as will be described below, which support the blades 20 from the plow frame 12. The blades 20 are supported such that their outer end portions 20B are provided in spaced relation to one another and behind an outer end portion 24 of the lead one plow bottom 16A generally along a line L extending in a desired relationship, such as generally parallel, to the direction F of forward movement of the plow 10. In such positions, the transversely-extending terrace-forming blades 20 can move soil plowed by the respective the plow shares 16B to the same location laterally from the longitudinal frame 14 of the plow 12 as to where soil is moved by the lead one of the plow bottoms 16A for building a terrace on the field being plowed.

Referring to FIGS. 1-4, the components of the blade-mounting means 22 of the attachment assembly 10 include a plurality of support members 26, an elongated spacer member 28, a plurality of connector members 30, a transporting member 32, and a load transferring member 34. All of the components of the blade-mounting means 22 are preferably constructed of a suitable metal material.

The support members 26 of the blade-mounting means 22 are removably to the respective legs 18 which attach the plow bottoms 16 to the frame 14. Thus, the support members 26 are mounted in a generally vertical orientation adjacent to and rearwardly of the respective trailing plow shares 16B behind the leading bottoms 16A.

More particularly, each support member 26 has a flat plate-like mounting portion 36 with a pair of slots 38 which receive fasteners 40 in order to firmly attach the support member 26 to the respective leg 18. The slots 38 extend in an inclined relation to the longitudinal extent of the mounting portion 36 to enable the position of the support member 26 on the leg 18 to be adjusted in both vertical and horizontal directions. Each support member 26 also has an elongated pin 42 rigidly attached along an edge of a triangular-shaped tab 44 which in turn, is fixedly attached transversely across a lower end of the mounting portion 36. An end 42A of the pin 42 having external threads 46 projects past one vertical edge 36A of the mounting portion 36 to expose the pin end 42A for receipt through a hole 48 formed through the inner end portion 20A of a respective one elongated blade 20. Fasteners 47 and washers 49 are inserted over the ends 42A of the pins 42 and tightened thereon. In such manner, each blade 20 is pivotally mounted at the inner end portion 20A thereof to the plow frame 14.

The elongated spacer member 28 of the blade-mounting mounting means 22 overlies the elongated terrace-forming blades 20 and extends in a generally transverse relation to the elongated blades 20. Preferably, the elongated spacer member 28 is in the form of an elongated hollow tube or solid bar. The connector members 30 of the blade-mounting means 22 are disposed in spaced relation to one another and rigidly attached along a lower side of the elongated spacer member 28. Each connector member 30 has a right triangular shape, extends downwardly from the elongated spacer member 28, and is located behind a given one of the elongated terrace-forming blades 20 at a location on the blade being closer to the outer end portion 20B than to the inner end portion 20A thereof.

Each blade 20 includes an upper bracket 50 and a lower socket element 52 disposed in generally vertical alignment with one another and being attached to a rear side of the blade at the outer location thereon. The upper bracket 50 is releasably connected by a fastener 54 to an upper portion of a given one connector member 30. The lower socket element 52 releasably seats a lower pointed end 30A of the given one connector member 30. In such manner, each connector member 30 is releasably attached to a respective one terrace-forming blade 20.

The transporting member 32 of the blade-mounting means 22 is removably connected by a bracket 56 to the plow frame 14 and coupled by a pin 58 in a tab 60 on the elongated spacer member 28 intermediately between its forward and rearward ends. The transporting member 32 is generally rigid so as to support the spacer member 28 laterally outwardly from the plow frame 14 at desired position relative to the plow shares 16. The transporting member 32 can be either an elongated hollow tube or solid bar or, optionally, it can be a hydraulic cylinder.

The load transferring member 34 of the blade-mounting means 22 can be a flexible link chain or other suitable device. The load member 34 is removed connected to and extends between to the lead plow bottoms 16A and the forward end of the elongated spacer member 28. In such position, the load member 34 is capable of transferring to the lead plow bottom the loads imposed on the elongated terrace-forming blades 20 by the soil being moved by the blades.

The terracing attachment assembly 10 is usually utilized with plows ranging in size from two to five bottoms, depending upon the size of the terraces that are to be built. The number of terrace-forming extension blades 20 employed by the terracing attachment assembly 10 is one less than the number of bottoms of the plow 12 since the lead moldboard plow bottom does not have a blade 20 associated with it.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A terracing attachment assembly for use with a moldboard plow movable in a forward direction across a field and having a frame and a plurality of moldboard plow bottoms supported below the frame in a fore-and-aft spaced apart and laterally staggered relation to the direction of forward movement of the plow, said attachment assembly comprising:
   (a) a plurality of elongated blades; and
   (b) means attachable to the plow frame for mounting said elongated blades in a generally transverse relation to the direction of forward movement of the plow and adjacent to given ones of the plow bottoms as lateral extensions thereof such that outer end portions of said elongated blades are provided in spaced relation to one another and aligned generally along a line extending in a desired relationship to the direction of forward movement of the plow such that said transversely extending elongated blades can move soil plowed by the given ones of the plow bottoms to the same lateral location for building a terrace on a plowed field;
   (c) said plurality of elongated blades being one less in number than the number of plow bottoms and being attachable to given ones of the plow bottoms other than a lead one thereof.

2. The assembly of claim 1 wherein said outer end portions of said elongated blades are alignable behind an outer end portion of a lead one of the plow bottoms.

3. The assembly of claim 1 wherein said elongated blades have generally rectangular flat configurations.

4. The assembly of claim 1 wherein said mounting means includes a plurality of support members attachable to the plow frame adjacent to and rearwardly of the given ones of the plow bottoms, each of said support members pivotally mounting one of said elongated blades at an inner end portion of said blade.

5. A terracing attachment assembly for use with a moldboard plow movable in a forward direction across a field and having a frame and a plurality of moldboard plow bottoms supported below the frame in a fore-and-aft spaced apart and laterally staggered relation to the direction of forward movement of the plow, said attachment assembly comprising:
   (a) a plurality of elongated blades; and
   (b) means attachable to the plow frame for mounting said elongated blades in a generally transverse relation to the direction of forward movement of the plow and adjacent to given ones of the plow bottoms as lateral extensions thereof such that outer end portions of said elongated blades are provided in spaced relation to one another and aligned generally along a line extending in a desired relationship to the direction of forward movement of the plow such that said transversely extending elongated blades can move soil plowed by the given ones of the plow bottoms to the same lateral location for building a terrace on a plowed field;
   (c) said outer end portions of said elongated blades being alignable generally along a line extending in a generally parallel relationship to the direction of forward movement of the plow.

6. A terracing attachment assembly for use with a moldboard plow movable in a forward direction across a field and having a frame and a plurality of moldboard plow bottoms supported below the frame in a fore-and-aft spaced apart and laterally staggered relation to the direction of forward movement of the plow, said attachment assembly comprising:
   (a) a plurality of elongated blades; and
   (b) means attachable to the plow frame for mounting said elongated blades in a generally transverse relation to the direction of forward movement of the plow and adjacent to given ones of the plow bottoms as lateral extensions thereof such that outer end portions of said elongated blades are provided in spaced relation to one another and aligned generally along a line extending in a desired relationship to the direction of forward movement of the plow such that said transversely extending elongated blades can move soil plowed by the given ones of the plow bottoms to the same lateral location for building a terrace on a plowed field;
   (c) said mounting means including:
      (i) an elongated spacer member extending in a generally transverse relation to and overlying said elongated blades;
      (ii) a plurality of connector members attached in spaced relation along said spacer member and extending downwardly therefrom behind each of said elongated blades at locations on said blades being closer to outer end portions than to said inner end portions thereof, and
      (iii) means attached to a rear side of each of said elongated blades at said locations thereon for connecting said connector members to said respective elongated blades.

7. The assembly of claim 6 wherein said mounting means also includes means connectible to the plow frame and coupled to said elongated spacer member for supporting said spacer member laterally outwardly from the plow frame at desired position relative to the plow bottoms.

8. A terracing attachment assembly for use with a moldboard plow movable in a forward direction across a field and having a frame and a plurality of moldboard plow bottoms supported below the frame in a fore-and-aft spaced apart and laterally staggered relation to the direction of forward movement of the plow, said attachment assembly comprising:
   (a) a plurality of elongated blades being one less in number than the number of the plow bottoms of the moldboard plow; and
   (b) means attachable to the plow frame for mounting said elongated blades in a generally transverse relation to the direction of forward movement of the plow and adjacent to given ones of the plow bottoms, other than a lead one thereof, as lateral extensions of the given plow bottoms such that outer end portions of said elongated blades are provided in spaced relation to one another and alignable behind an outer end portion of the lead one of the plow bottoms generally along a line extending in a desired relationship to the direction of forward movement of the plow such that said transversely extending elongated blades can move soil plowed by the given ones of the plow bottoms to the same lateral location for building a terrace on a plowed field.

9. The assembly of claim 8, wherein said outer end portions of said elongated blades are alignable generally along a line extending in a generally parallel relationship to the direction of forward movement of the plow.

10. The assembly of claim 8 wherein said elongated blades have generally rectangular flat configurations.

11. The assembly of claim 8 wherein said mounting means includes a plurality of support members attachable to the plow frame ad to and rearwardly of the given ones of the plow bottoms each of said support members pivotally mounting one of said elongated blades at an inner end portion of said blade.

12. The assembly of claim 8 wherein said mounting means includes:
   an elongated spacer member extending in a generally transverse relation to and overlying said elongated blades;
   a plurality of connector members attached in spaced relation along said spacer member and extending downwardly therefrom behind each of said elongated blades at locations on said blades being closer to outer end portions than to said inner end portions thereof; and
   means attached to a rear side of each of said elongated blades at said locations thereon for connecting said connector members to said respective elongated blades.

13. The assembly of claim 12 wherein said mounting means also includes means connectible to the plow frame and coupled to said elongated spacer member for supporting said spacer member laterally outwardly for plow frame at desired position relative to the plow bottoms.

14. The assembly of claim 12 wherein said mounting means also includes means connectible to the lead one of the plow bottoms and connected to a forward end of said elongated spacer member for transferring loads imposed on said elongated blades by soil moved by said blades to the lead one of the plow bottoms.

15. In combination with a moldboard plow movable in a forward direction across a field and having a frame, a plurality of moldboard plow bottoms, and a plurality of means attached to the frame for supporting the moldboard plow bottoms below the frame arranged in a spaced apart relation between the front and rear of the plow and along and in a laterally staggered relation to the direction of forward movement of the plow, a terracing attachment assembly comprising:
   (a) a plurality of elongated blades being one less in number than the number of moldboard plow bottoms of the plow, each of said blades having opposite inner and outer end portions; and
   (b) means attached to the frame of the plow for mounting each of said blades in generally transverse relation to the direction of forward movement of the plow and as a lateral extension of a given one of the moldboard plow bottoms of the plow other than a lead one of the plow bottoms, said mounting means for supporting said blades such that said outer end portions thereof are provided in spaced relation to one another and aligned behind an outer end portion of the lead one of the plow bottoms generally along a line extending in a desired relationship to the direction of forward movement of the plow such that the transversely extending blades can move soil plowed by the given ones of the moldboard plow bottoms to the same lateral location as the lead one of the moldboard plow bottoms for building a terrace on a plowed field.

16. The assembly of claim 15 wherein said outer end portion of said elongated blades are aligned generally along a line extending in a generally parallel relationship to the direction of forward movement of the plow.

17. The assembly of claim 15 wherein said elongated blades have generally rectangular flat configurations.

18. The assembly of claim 15 wherein said mounting means includes:
   a plurality of support members attachable to the plow frame adjacent to and rearwardly to the given ones of the plow bottoms, each of said support members pivotally mounting one of said elongated blades at an inner end portion of said blade;
   an elongated spacer member extending in a generally transverse relation to and overlying said elongated blades;
   a plurality of connector members attached in spaced relation along said spacer member and extending downwardly therefrom to locations behind each of said elongated blades at locations closer to said outer end portions than said inner end portions thereof;
   means attached to a rear side of each of said elongated blades at said locations for connecting said connector members to said respective elongated blades; and
   means connectible to the plow frame and coupled to said elongated spacer member for supporting said spacer member laterally outwardly from the plow frame at desired position relative to the plow bottoms.

19. The assembly of claim 18 wherein said mounting means also includes means connectible to the lead one of the plow bottoms and connected to a forward end of said elongated spacer member for transferring loads imposed on said elongated blades by the soil moved by said blades to the lead one of the plow bottoms.

* * * * *